United States Patent Office 2,716,762
Patented Sept. 6, 1955

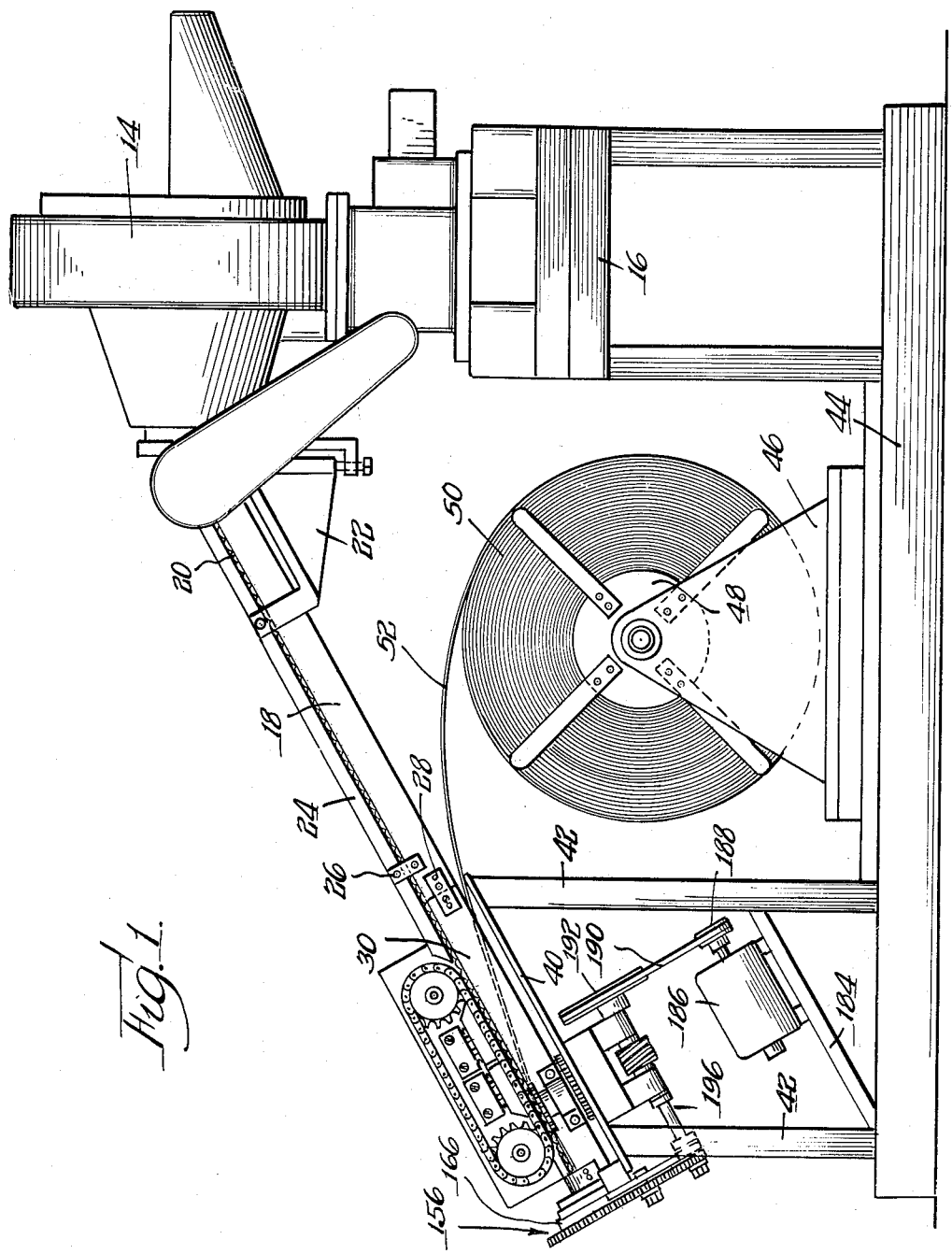

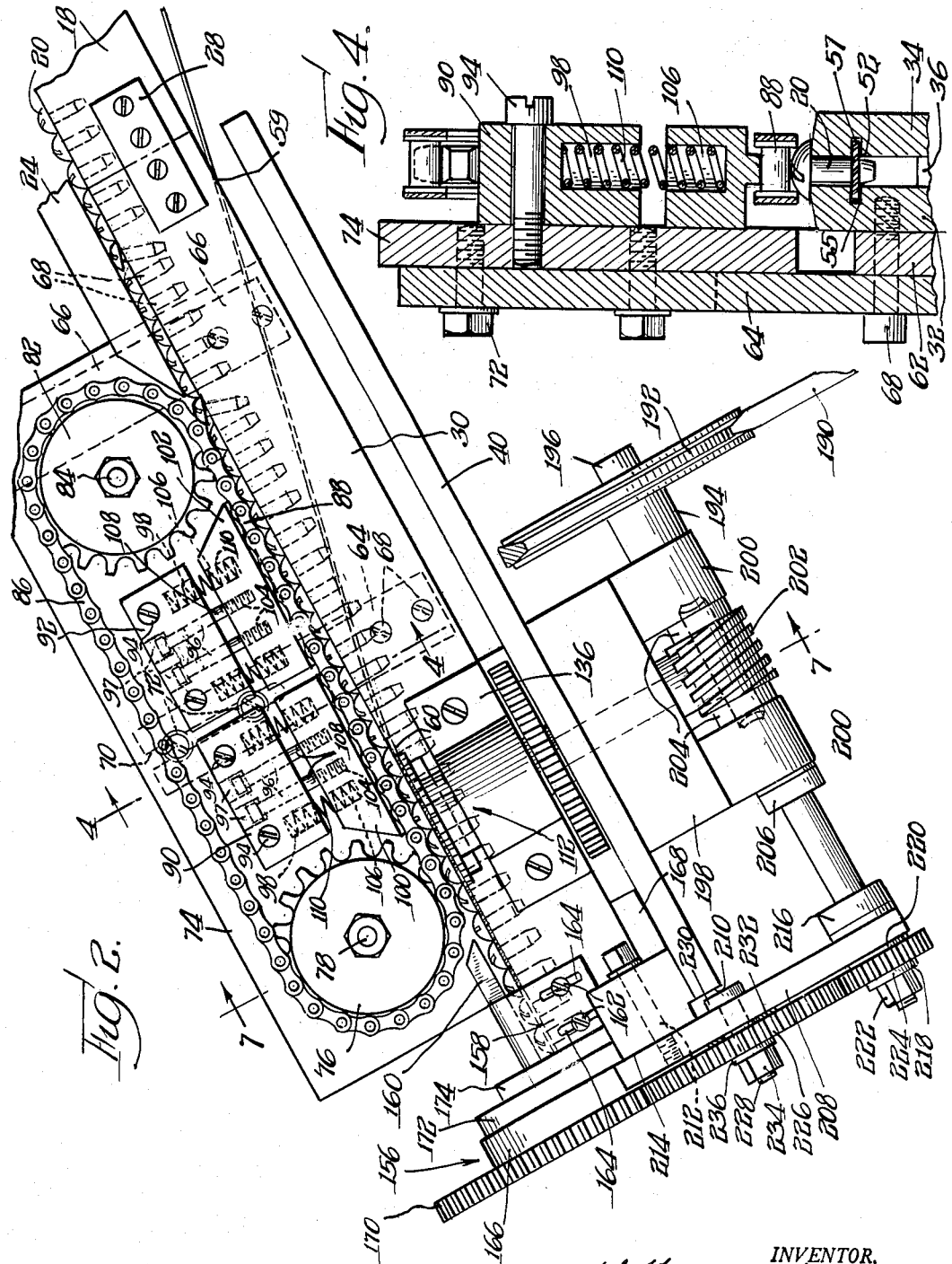

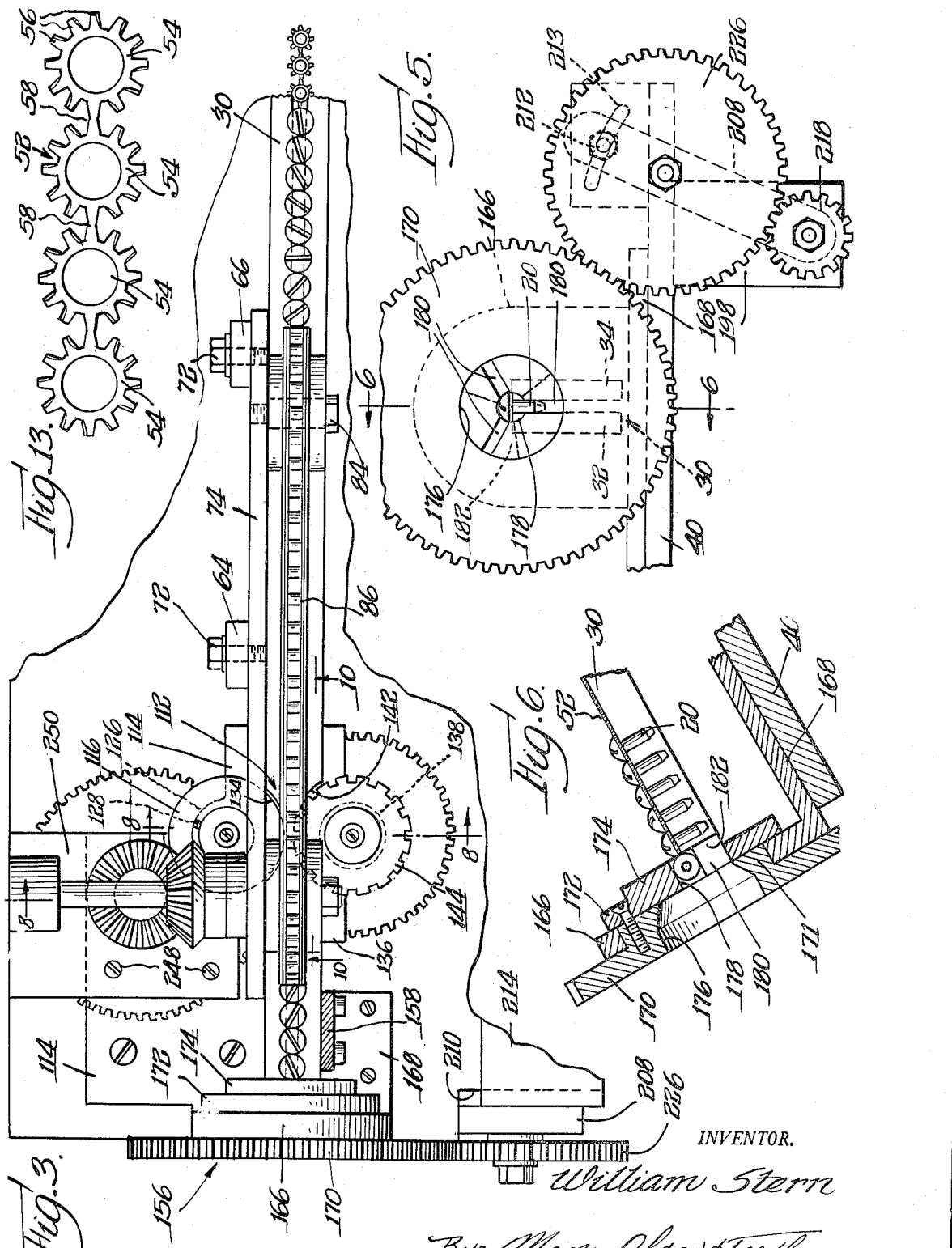

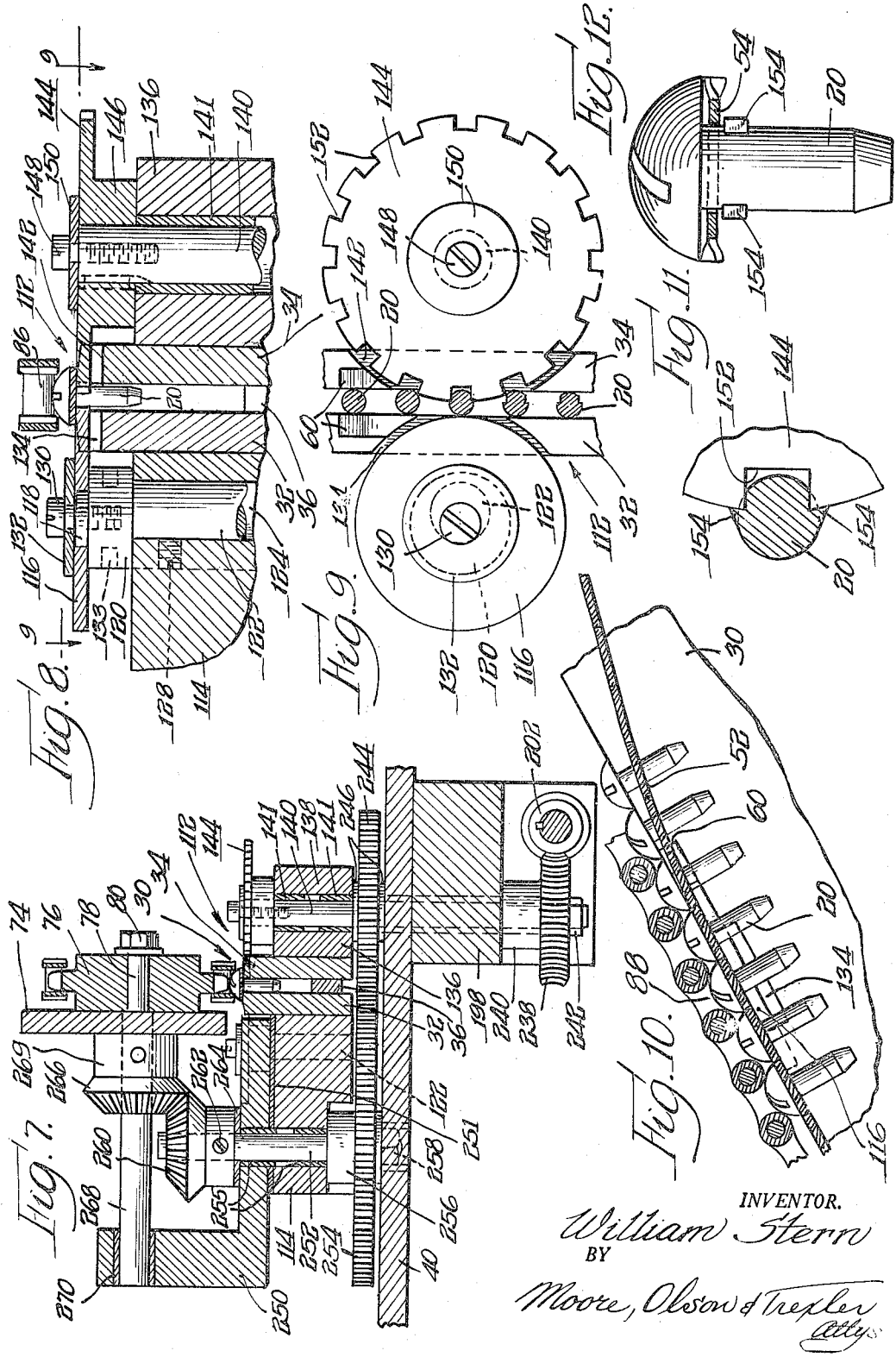

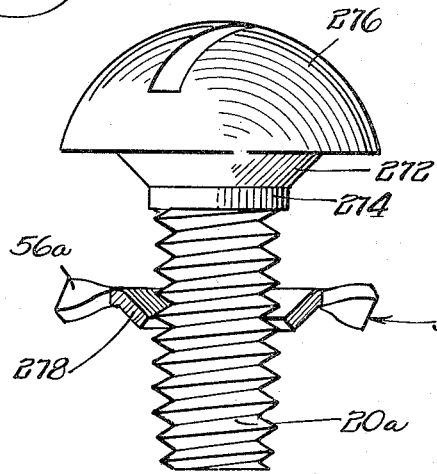
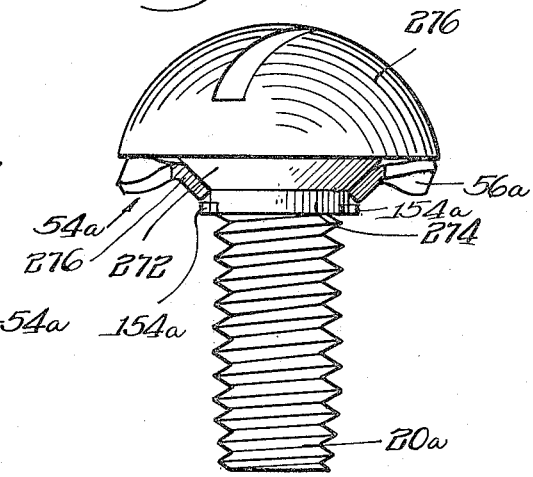
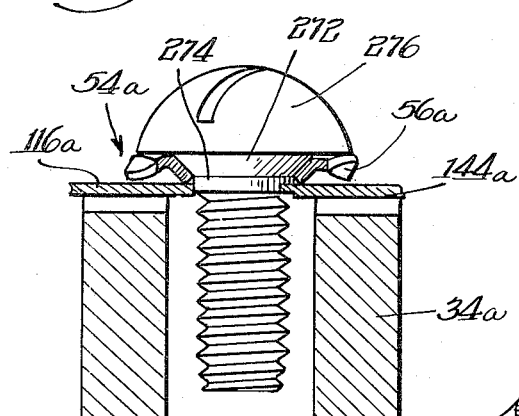
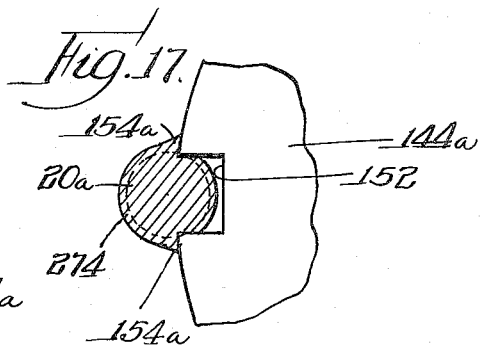
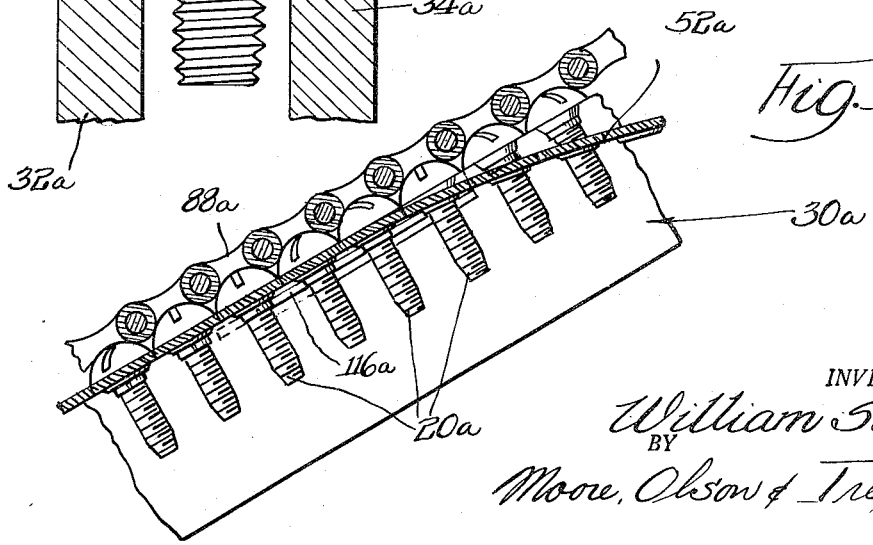

2,716,762

METHOD AND MACHINE FOR ASSEMBLING WASHERS WITH ROTARY FASTENERS

William Stern, Park Ridge, Ill., assignor to Illinois Tool Works, Chicago, Ill., a corporation of Illinois Application August 3, 1950, Serial No. 177,503

26 Claims. (Cl. 10—155)

This invention is concerned with a machine and methods for producing unit assemblies of washers and rotary fasteners, particularly lock washers and screws or screw blanks.

This invention contemplates the assembly of fasteners with a strip of washers as the strip is unrolled from a coil. Previous commercial machines for assembling fasteners with a strip of washers supplied from a coil have fed the fasteners or the strip intermittently or have employed intermittently operating assembly mechanism. The intermittent motion has limited the speed of production. Many such machines have had thread forming mechanisms as an integral part, and the thread forming mechanisms have limited the speed of production.

An object of this invention is the provision of a machine and method for assembling fasteners with a strip of washers at a greater speed than heretofore thought possible.

A further object of this invention is the provision of a machine and method for assembling rotary fasteners and washers at an increased rate by moving the fasteners and the washers along substantially rectilinear paths.

Yet another object of this invention is the provision in a machine for assembling headed screw blanks and washers, of feeding mechanism engaging the heads of screw blanks properly to space the screw blanks and to force the undersides of the heads thereof against a guide rail thereby to align the shanks of the screw blanks with the washers of a strip of adjoined washers and to prevent binding of the screw blanks while feeding the screw blanks at a high rate of speed.

The most convenient and efficient means known for feeding screws or screw blanks is a straight inclined chute through which screws or screw blanks are fed by gravity while supported by the heads with their shanks depending in a slot in the chute. Assembly devices which require the use of other feed means which are less efficient necessarily reduce the feed rate and rate of assembly.

An important object of this invention is the provision of apparatus for assembling a succession of screw blanks and a succession of washers while the screw blanks are being fed by an inclined chute.

Another object of this invention is the provision of apparatus for assembling a strip of contacting interconnected washers and a succession of rotary fasteners wherein the strip is bent only substantially normally to the plane of the strip in the direction the strip flexes most readily without danger of fracture.

Another object of this invention is the provision of a machine for assembling rotary fasteners and washers in strip form moving from a spiral coil over a path having no reverse bends to reduce the possibility of fracturing said strip.

A further object of this invention is the provision of apparatus for assembling rotary fasteners and a strip of adjoined washers wherein the strip is bent relatively sharply only after assembly so that fracture of the strip, if such occurs, is unimportant.

Another object of this invention is the provision of apparatus for assembling asymmetrical washers and rotary threaded or threadable fastener elements.

Yet another object of this invention is the provision of apparatus for assembling rotary fasteners and washers which is set up for operation with greater facility than heretofore thought possible.

Other and further objects and advantages of the present invention will be apparent from the following description when taken in connection with the accompanying drawings in which:

Fig. 1 is a side view of an assembling machine embodying the principles of my invention;

Fig. 2 is an enlarged view of the assembly portion of the machine;

Fig. 3 is a top view of the portion of the machine shown in Fig. 2;

Fig. 4 is a sectional view taken along the line 4—4 of Fig. 2;

Fig. 5 is a partial end view of the machine;

Fig. 6 is a sectional view taken substantially along the line 6—6 of Fig. 5;

Fig. 7 is a sectional view taken along the line 7—7 of Fig. 2;

Fig. 8 is an enlarged sectional view taken along the line 8—8 of Fig. 3;

Fig. 9 is a fragmentary view taken along the line 9—9 of Fig. 8;

Fig. 10 is a fragmentary sectional view taken substantially along the line 10—10 of Fig. 3;

Fig. 11 is an enlarged view of a portion of Fig. 9 showing the formation of a temporary retainer on a screw shank;

Fig. 12 is an enlarged view of a screw blank and washer assembled thereon;

Fig. 13 is a view showing a section of the washer strip operated on by my machine;

Fig. 14 is an enlarged view of a screw and an asymmetrical washer partially assembled thereon;

Fig. 15 is a view similar to Fig. 14 showing the screw and washer in assembled relation;

Fig. 16 is a fragmentary view similar to Fig. 8 showing the screw and washer of Figs. 14 and 15;

Fig. 17 is a view similar to Fig. 11 showing the formation of a retainer on the shank of the screw of Figs. 14 and 15; and Fig. 18 is a view similar to Fig. 10 showing the assembly of a succession of screws and a strip of asymmetrical washers such as those shown in Figs. 14 and 15.

Referring first to Fig. 1, there is shown a high speed feed hopper 14 supported on a base 16. The feed hopper may be similar to that shown by William C. Anderson in his application Serial No. 668,888, filed May 10, 1946 and entitled, "Screw Feeding Hopper" now Patent No. 2,531,099 issued November 21, 1950 or of any satisfactory construction delivering properly oriented screws at the desired high speed rate to a feed chute 18. The feed chute may comprise a pair of spaced apart rails or may comprise a single rail with a deep central longitudinal slot accommodating the shanks of a succession of screw blanks 20 fed from the hopper 14. The upper end of the feed chute is supported from the hopper by means of a bracket 22 which also serves to support a third or overhead rail 24 which overlies the heads of the screw blanks 20 and maintains the blanks with their shanks between the two rails of the feed chute 18. An additional bracket 26 supports the overhead rail 24 from the spaced rails near the lower end thereof.

The feed chute 18 is secured at its lower end by means of straps 28 to an assembly track 30 (see also Figs. 2 and 3). The assembly track 30 comprises a continuation of the feed chute 18 and includes a pair of parallel spaced apart rails 32 and 34 (Fig. 4) secured to one another in spaced relation by a plurality of spacers 36 (Figs. 4, 7 and 8). The track is supported from an inclined table 40 by means later to be described. The inclined table 40 is supported by legs 42 resting on an underlying support member 44 which also underlies the base 16 of the hopper 14.

The underlying support member 44 also carries a bracket 46 supporting a reel 48 on which there is a spiral coil 50 of washers in the form of a continuous strip 52. A section of the washer strip 52 is shown in Fig. 13 and comprises a succession of individual lock washers 54 of the type having radially extending twisted teeth 56. Adjoining teeth of successive washers are connected as at 58. The washer strip 52 leads from the reel 48 over a substantially continuously curved plane path.

The assembly mechanism

The assembly track as mentioned heretofore comprises a path of spaced apart rails 32 and 34. The top surfaces of these rails are straight longitudinally and the screw blanks 20 are supported by engagement of the top surfaces of these rails against the undersides of the heads of the screw blanks with the shanks depending between the rails. As may be seen in Figs. 4, 7, and 8, the top surfaces of the rails are flat adjacent the slot between the for about 1/32 inch to each side of the slot and are thereafter relieved to reduce friction between the rails, and the moving screws and washer strip. Parallel slots 55 and 57 in the confronting faces of the rails 32 and 34 form a washer strip guideway. The guideway extends diagonally from the lower edge of the assembly track 30 at 59 to the top edge of the track at 60 (Figs. 2 and 10). The guideway is straight throughout most of its length, but is curved slightly near its upper edge at 60 to reduce the sharpness of the bend of the washer strip and thereby minimize the possibiilty of fracture of the strip.

Spacers 62 space upstanding supports 64 and 66 (Figs. 2-4) from the assembly track rail 32 and bolts 68 pass through the supports and through the spacers and are threaded into the rail 32. The upstanding supports 64 and 66 are provided in their upper portions with elongated slots 70. A pair of bolts 72 passes through each of the slots 70 and the bolts are threaded into a drive support plate 74. The drive support plate 74 may be adjusted toward and from the assembly track by loosening the bolts to accommodate screws having heads of different sizes as will be apparent hereinafter. The bolts are tightened to secure the support plate in adjusted position. A sprocket wheel 76 (Fig. 7) is keyed or otherwise secured to a shaft 78 for rotation therewith and the shaft is journalled in the drive support plate 74 near one end thereof. A washer and nut 80 secure the sprocket against a shoulder on the shaft 78. An idler sprocket wheel 82 is carried on a headed shaft 84 having a reduced portion threaded into the drive support plate 74 near the end thereof opposite the sprocket wheel 76. An endless chain or link belt 86 passes over the sprocket wheels and has its lower reach 88 extending parallel to the top surface of the assembly track 30 and spaced slightly therefrom so that each link engages the head of a screw blank 20, as shown in Figs. 2 and 10 to advance the screw blanks through the assembly track.

A pair of anchor blocks 90 and 92 are secured to the drive support plate 74 within the area circumscribed by the silent chain 86 by means such as screws or bolts 94 passed through the blocks and threaded into the support plate. Each of the anchor blocks 90, 92 is provided with a pair of bores 96 of relatively small diameter countersunk as at 97 and with a pair of bores 98 of relatively larger diameter. Presser blocks or shoes 100 and 102 are positioned below the blocks 90 and 92 respectively and in sliding contact with the upper surface of the lower reach 88 of the endless chain. Small diameter tapped bores 104 and larger diameter bores 106 are provided in the shoes 100 and 102 in alignment with the bores 96 and 98 respectively. Headed screws 108 are placed in the aligned bores of small diameter with their heads in the countersunk positions 97 to maintain the shoes and blocks in alignment and compression springs 110 are placed in the aligned bores of larger diameter to maintain the lower reach 88 of the endless chain in firm engagement with the heads of the screw blanks 20 to maintain the heads of the blanks against the upper surface of the assembly track 30 while driving the blanks at a rapid rate. The initial compression of the springs 110 and the maximum downward movement of the shoes can be adjusted by threading the screws into or out of the shoes. The screws fit sufficiently loosely in the blocks 90, 92 that the lower reach 88 of the chain and the shoes 100, 102 are readily forced upwardly against the action of springs 110 by the heads of screws passing beneath the chain.

The retainer forming mechanism

To prevent separation of the screws and washers after assembly, I have provided retainer forming mechanism indicated generally as 112. A bracket 114 (Figs. 3 and 7) is secured by bolts or the like to the inclined table 40 with one edge bolted or otherwise suitably secured to the rail 32 to thereby support the assembly track 30.

A circular abutment plate or back up roller 116 (see also Figs. 8 and 9) is mounted for rotation on a stub shaft 118 extending from a circular block 120 integral with a shaft 122 and eccentric relative to this shaft. The shaft is carried in a bore 124 in a shoulder portion 126 (Fig. 3) of the supporting bracket 114. A set screw 128 extends through this shoulder portion and bears against the shaft 122 to hold it in adjusted position. The back up roller 116 is secured to the stub shaft 118 by a screw or bolt 130 extending through a washer 132 and threaded into the stub shaft 118 and circular block 120. The back up roller 116 fits in a recess 134 of the rail 32 of the assembly track and generally extends slightly therebeyond to abut each successive screw blank 20. The exact distance which the back up roller extends beyond the rail depends among other things on the size and material of the screw blank and it may be adjusted by loosening the set screw 128 and rotating the circular block 120 and shaft 122, there being radial apertures 133 provided in the block 120 to accommodate a wrench for this purpose. The recess 134 accommodating the back up roller 116 is substantially arcuate in form and the rail 32 very nearly contacts the periphery of this roller so that the rail and roller between them provide support beneath the head of each screw blank.

A bracket 136 having a shoulder portion 138 lies along the assembly track 30 directly opposite the supporting block 114 and is bolted or otherwise secured to the rail 34 of the track 30. A rotatable shaft 140 is journalled in sleeve bearings 141 within the shoulder portion 138 and carries at its upper end a scoring or swaging roller 144 having a hub 146 keyed or otherwise secured to the shaft 140 for rotation therewith. The swaging roller 144 lies in the same plane as the back up roller 116 and is retained on the end of the shaft 140 by a screw or bolt 148 passing through a washer 150 and threaded into the end of the shaft 140. An arcuate recess 142 in the top of the rail 34 accommodates the scoring roller 144 which has its top surface lying in the same plane as the top surface of the assembly track. The periphery of the scoring roller 144 is provided with a plurality of sharp edged rectangular notches 152 arcuately spaced equally to the linear spacing between successive screw blanks assembled with the washer strip and having a peripheral dimension slightly less than the diameter of the screw blanks 20. Thus each screw blank is engaged by the sharp edges or corners of one of the notches 152 and forced against the back up roller 116 to displace sections of metal 154 outwardly from the shank of the screw as best may be seen in Figs. 9 and 11 to form temporary retainers. As may be seen in Fig. 12 the outwardly displaced metal sections 154 forming the temporary retainers underlie the individual washers 54 of the washer strip 52 and prevent disassembly of the screw blanks and washers. By having the swaging roller 144 engage the screw blank shanks from one side only with the shanks backed up by the freely rotatable back up roller 116, the necessity of any synchronism between retainer forming mechanism on opposite sides of the shank is obviated.

*The severing mechanism*

The assembly track 30 continues beyond the retainer forming mechanism 112 to a severing mechanism 156 (Figs. 1–3 and 6). The continuation of the assembly track 30 supports by means of a bracket 158 a third or overlying rail 160 similar to the feed chute rail 24 to maintain the screw blanks in fully seated position in the washers of the strip 52, and in the track 30 with the washers flat against the top surface thereof. The bracket 158 is secured to the assembly track 30 by means of screws 162 passing through elongated slots 164 in the bracket in order that the spacing of the rail 160 relative to the assembly track 30 may be adjusted.

An upstanding plate 166 perpendicular to the track 30 is secured to the table 40 and is provided with a circular aperture. The plate is secured to the table 40 by means of a flange 168 which may be an integral part of the supporting bracket 114 and is bolted or screwed to the plate 40. A large gear 170 (see also Fig. 5) has a rearwardly extending hub 171 fitting within the circular aperture of the plate 166. A securing plate 172 of slightly larger diameter than the circular aperture through the supporting plate 166 is secured to the rearwardly extending hub 171 of the gear 170 by means such as screws or bolts, and a hub 174 integral with the securing plate 172 extends rearwardly therefrom substantially to contact the end of the assembly track 30. The gear 170 and its hub 171 are provided with a circular central aperture 176 communicating with a central bore 178 and three equally arcuately spaced slots 180 through the securing plate 172 and hub 174. The central bore 178 is of substantially the same diameter as a washer and the head of a screw blank 20 assembled therewith while each of the slots 180 is of sufficient width to pass a screw blank shank. A recess 182 (Figs. 5 and 6) is provided in the rear face of the hub 174 in communication with each slot 180 and extending in the direction of rotation therefrom.

*The driving mechanism*

A table 184 (Fig. 1) is carried by the supporting legs 42 in substantial parallelism with the table 40 and spaced therebelow. An electric motor 186 is secured to the table 184 and has a pulley 188 on its shaft over which is passed a flexible belt 190. The belt 190 is also passed over a pulley wheel 192 (see also Fig. 2) having an integral hub 194 by means of which it is secured to a shaft 196. A block 198 is secured to the underside of the table 40 and has a pair of spaced depending bearing arms 200 in which the shaft 196 is journalled. A worm 202 is keyed to the shaft 196 between the bearing arms 200 and is spaced from them by collars 204. A collar 206 is secured to the shaft 196 by a pin or set screw and abuts one of the arms 200 to prevent axial movement of the shaft 196 in one direction. Axial movement of the shaft in the other direction is prevented by the collar 194.

A supporting arm 208 (see also Fig. 5) extends downwardly at right angles to the table 40 and fits within a recess 210 at the end of the table. The arm is supported by means of a bolt 212 fitting through an arcuate slot 213 in an anchor block 214 which is secured in turn to the table 40 by any desirable means. A bore is provided near the lower end of the arm 208 wherein the extending end of the shaft 196 is journalled by means of a suitable bearing. A collar 216 similar to the collar 206 is secured to the shaft 196 on one side of the supporting arm 208 while a spur gear 218 is keyed to the shaft on the opposite side of the arm 208. The gear is spaced from the arm 208 by means of a washer or the like 220 and is maintained on the shaft by means of a nut 222 threaded on the end of the shaft and holding a washer 224 against the face of the gear.

The spur gear 218 is meshed with an idler gear 226 mounted on a stub shaft 228 carried by the supporting arm 208. The shaft 228 is provided with a head 230 and the gear 226 is spaced from the arm 208 by means of a washer or the like 232. The idler gear is maintained on the shaft 230 by means of a nut 234 threaded on the end of the shaft and impinging against a washer 236. In addition to being meshed with the spur gear 218, the spur gear 226 is meshed with the large gear 170 forming a part of the severing mechanism so that the gear 170 is continuously rotated at a constant rate by the shaft 196. Proper engagement of the idler gear 226 with the gear 170 readily is brought about by loosening the bolt 212 and sliding it back and forth in the arcuate slot 213 to pivot the arm 208 about the shaft 196.

The shaft 140 to which the scoring roller 144 is keyed extends downwardly through the table 40 and bearing support block 198 and has a worm wheel 238 having an integral hub 240 keyed to its lower end and secured thereon by a nut 242, the worm wheel being meshed with the worm 202. A spur gear 244 is keyed to the shaft 140 between the bracket 136 and the table 40 and is spaced from these two members by means of spacers or washers 246. An angle bracket 250 is spaced from the supporting bracket 114 by a suitably slotted replaceable shim 251 and is secured to the bracket by means of bolts 248. A shaft 252 journalled in suitable sleeve bearings 255 extends through the bracket, shim, and block and a spur gear 254 having an integral hub 256 is keyed to the lower end of the shaft 252 with the gear and its hub fitting within appropriate recesses in the bracket 114 and the gear meshed with the gear 244. A nut 258 is threaded on the lower end of the shaft 252 and clamps a washer against the gear to hold it in position. An aperture is provided in the plate 40 to accommodate the nut and the shaft extending therethrough. A bevel gear 260 is slidably keyed to the upper end of the shaft 252 and is secured thereto by means such as a pin or set screw passing through a hub 262 integral with the gear. A washer or spacer 264 maintains the hub out of contact with the horizontal portion of the bracket 250. The bevel gear 260 is meshed with a bevel gear 266 keyed to a shaft 268 which comprises a continuation of the sprocket drive shaft 78. The bevel gear 266 has an integral collar 269 and a pin or set screw carried by this collar secures the gear on the shaft 268. The outwardly extending end of the shaft 268 is rotatably journalled in a bearing sleeve 270 carried by the upstanding arm of the bracket 250. When the endless chain is adjusted upwardly or downwardly to accommodate screws having heads of different sizes, the bolts 248 holding the bracket 250 and the set screw 262 securing the bevel gear 260 are loosened and the shim 251 is removed so that the bracket 250 can be shifted vertically with the drive support plate 74 to keep the bevel gear 260 properly meshed with the bevel gear 266. After suitable adjustment a shim 251 of different thickness is inserted and the bolts 248 and set screw 262 are tightened.

*Operation*

To set up the machine for operation it is only necessary to place a strip of washers 52 in the form of a spiral coil 50 on a reel 48 on the bracket or support 46 and to feed the washer strip into the slots 54 and 56 at the lower edge 59 thereof and part way into the guideway by hand. Screws are delivered down the feed chute 18 from the high speed hopper 14 and the electric motor 186 is started. The motor drives the shaft 196 which acts through the worm and worm wheel 202 and 238 to drive the swaging roller 144. The gear 244 drives the spur gear 254 to rotate the bevel gears 260 and 266 and to drive the sprocket drive wheel 76 and the endless chain 86. The lower reach 88 of the chain engages the heads of the screw blanks (Figs. 2 and 10) to drive the screws along the top of the assembly track at a high rate of speed with their shanks depending in the slot between the rails 32 and 34 of the assembly track. As the shanks of the screws engage the apertures in the washers of the washer strip 52, the screws act to drive the washer strip. Due to the substantially linear convergence of the screw blanks and the washer strip, the screw blanks are readily aligned with the apertures in successive washers by maintaining the blanks in proper spaced relation with their shanks substantially perpendicular to the top surface of the assembly track. This readily is accomplished by the lower reach 88 of the endless drive chain pushing downwardly against the heads of the screw blanks under the action of the shoes 100 and 102 to maintain the undersides of the screw blank heads flat against the top surface of the track. As the screw blanks and washer strip advance concurrently they are gradually telescoped relative to one another until the washer strip leaves the guideway at 60 to lie along the top surface of the assembly track in fully telescoped relation with the screw blanks. As best may be seen in Fig. 10, the guideway is curved to either side of the position 60 to bring the washer strip to the top surface of the assembly track over a bend which is not so sharp as to be likely to fracture the interconnections 58 between adjacent washers.

Immediately following the complete telescoping of the screw blanks 20 with the washers of the strip 52, the shanks of the screw blanks are engaged directly beneath the washer strip by the swaging roller 144 and back up roller 116 to displace metal sections 154 outwardly from the shanks of the screw blanks to form temporary retainers. The temporary retainers comprise very narrow sections which readily are rolled out when threads are rolled on to the shanks of the screw blanks by suitable thread rolling mechanism at a later time. Engagement of the lower reach 88 of the silent chain maintains the screw blanks and washers in fully telescoped relation at the time the temporary retainers are formed and there is thus no danger of retainers being formed too low on the screw blank shanks.

The assembled screws and washers then advance through the remainder of the length of the assembly track 30 to the severing mechanism 156 at which point successive assemblies of screw blanks and washers are received in the recesses 182, slots 180, and central bore 178 of the constantly rotating mechanism to twist each assembly relative to the next succeeding assembly (the succeeding assemblies being non-rotatably held by the track 30 and overhead rail 60) and thereby to sever successive assemblies from one another by fracturing the interconnection between successive washers. The severed assemblies then drop through the central aperture 176 into a storage container or into mechanism feeding them to any of a plurality of thread forming machines.

*Assembly of screws and asymmetrical washers*

The principles of the invention disclosed herein are applicable to the assembly of asymmetrical washers and threaded fasteners such as screws as illustrated in Figs. 14–18. As shown therein a succession of screws 20a having conical and cylindrical neck portions 272 and 274 respectively underlying the heads 276 are assembled with a strip 52a of toothed asymmetrical lock washers 54a. The washers are similar to those disclosed heretofore except the central section 278 lying between the aperture and the inner ends of the teeth 56a is substantially conical in shape.

The screws 20a are fed in the same manner as the screw blanks 20 from a high speed feed hopper into an assembly track 30a similar to the track 30 but having rails 32a and 34a spaced sufficiently far apart to accommodate the conical neck portions 272 so that the lower reach 88a of an endless feed chain can force the flat undersides of the heads 276 into contact with the top surfaces of the rails properly to position the screws. The washer strip 52a is fed through a guideway in the assembly track 30a similar to that in the track 30 to bring the washers of the strip and the screws into telescoped relation. As shown in Fig. 14, the washers clear the threads of the screws 20a during assembly and, when fully assembled, the washers fit against the undersides of the heads 276 with the conical sections 278 in contact with the conical neck portions 272 (Figs. 15 and 16).

The cylindrical neck portions 274 extend a short distance below the conical sections 278 of the washers and are engaged by the sharp edges or corners of spaced notches 152 about the periphery of a driven swaging wheel (or roller) 144a. The swaging wheel 144a forces the screws into abutment with a back up roller 116a to displace narrow sections of metal 154a from the cylindrical neck portions 274 to retain the screws and washers in assembled relation.

Feeding of the screws or screw blanks along a rectilinear path comprising a continuation of a feed chute throughout the entire assembly portion leads to faster and more efficient feeding than is possible with any other structure. The endless feed chain pressing down upon the screw or screw blank heads properly positions these fasteners and drives them with no tendency to bind. The washer strip being fed over a substantially straight path during assembly is moved with greater speed than is possible over any other path and with no tendency to bind. The overall path of the washer strip is a plane path having no reverse bends (i. e. it is a plane path of positive curvature) and there is little tendency for the washer strip to fracture. Possible fracture of the washer strip is further precluded by bending or flexing the strip only perpendicularly to the plane of the strip and by avoiding sharp bends. The only bend encountered by the washer strip occurs after the washers and fasteners have been nearly completely assembled and fracture of the strip thereby is rendered relatively unimportant.

The apparatus herein disclosed is more readily set up for operation than any heretofore known and with only minor changes can operate on strips of relatively flat or asymmetrical washers.

Although a particular form of my invention has been shown and described, it is to be understood that this is for illustrative purposes only and my invention is to be limited only by the spirit and scope of the appended claims.

I claim:

1. Apparatus for assembling fastening elements and washers, comprising means for continuously feeding a strip of washers over a predetermined path at a uniform continuous rate, and means for directing a succession of fastening elements substantially only over a rectilinear path converging with the path of said strip to bring said fastening elements and the washers of said strip into telescoping engagement, said directing means including a rectilinear guide track and an elongated conveyor means having a substantially straight reach parallel to and spaced from said guide track, said conveyor means including a plurality of elements spaced equally to the spacing between axes of the washers of said strip for engaging the fastening elements to maintain the fastening elements at right angles to the track and in proper spaced relation to the washers of said strip, said conveyor means being operated in timed relation with the movement of said strip, and said strip path and said track converging at a small acute angle so that the fastening elements initially telescope with the washers of said strip at a point spaced from the initial engagement of the conveyor means with the fastening elements.

2. Apparatus for assembling fastening elements and washer elements, comprising means for receiving a coiled strip of interconnected washer elements, means for feeding said strip over a rectilinear path from the coil at a predetermined rate, means for directing a succession of fastening elements transversely over a path aligned with and converging with the rectilinear path of said strip to bring said fastening elements and the washer elements of said strip into telescoping relation while said strip of washer elements and said fastening elements are moving, means for feeding the telescoped fasteners and washers along a substantially straight line continuation of said paths, means along said continuation for forming a section on one of each pair of assembled elements as said assembled elements move along said substantially straight line to retain the other element in assembled relation, and means for thereafter severing the washer elements from said strip, said severing means being operated in proper timed relation with the movement of the telescoped fastener and washer feeding means.

3. Apparatus for assembling fastening elements and washer elements, comprising means for receiving a coiled strip of washer elements, means for feeding said strip over a predetermined path, a feed chute for said elements, means for receiving fastening elements from said feed chute and concurrently engaging a plurality of fastening elements for feeding a succession of fastening elements in synchronism with the washer elements of said strip over a rectilinear path forming a substantially straight line continuation of said feed chute and relatively converging with the path of said strip to bring said fastening elements and the washer elements of said strip into telescoping relation, and means for forming a section on one of each pair of assembled elements to retain the other element in assembled relation, said fastening element feeding means comprising track means and endless conveyor means having a reach disposed parallel to and spaced from said track means, said conveyor means having elements thereon spaced equally to the washer elements of said strip and engageable with said fastening elements to hold said fastening elements against said track means at right angles to said track means and spaced equally to said washers, said track means and said washer strip feeding path converging at a small acute angle so that the fastening elements initially telescope with the washers of said strip at a point spaced from the initial engagement of the endless conveyor means elements with the fastening elements.

4. Apparatus for assembling headed fastening elements and washer elements, comprising means for feeding a strip of washer elements at a predetermined rate over a predetermined path, a feed chute for said fastening elements, conveyor means for receiving fastening elements from said feed chute and engaging the heads of said fastening elements for feeding a succession of fastening elements substantially transversely of their axes, in synchronism with said washer elements along a rectilinear path forming a substantially straight line continuation of said chute and converging with the path of said strip to telescope said fastening elements with the washer elements of said strip, track means against which the undersides of the heads of said fastening elements are held by said conveyor means with the fastening elements at right angles to the track means, said track means and said washer element strip feeding path converging at a small acute angle so that the fastening elements initially telescope with the washer strip at a point spaced from the initial engagement of the conveyor means with the heads of said fastener elements, means for forming a section on one of each pair of assembled elements to retain the other element in assembled relation, means for thereafter severing the washer elements of said strip from said strip, and means for operating said strip feeding means, said conveyor means, said section forming means, and said severing means in proper timed relation.

5. Apparatus for assembling rotary fasteners and washers, comprising means for feeding a washer strip over a predetermined path, a fastener feed chute, and means including an elongated endless conveyor having fastener carrying means and having a substantially straight reach for feeding a succession of rotary fasteners over a rectilinear path from said feed chute in synchronism with the movement of the washers and relatively converging with the path of said strip to bring said rotary fasteners and the washers of said strip into telescoping relation, and track means against which said rotary fasteners are held by said fastener carrying means of said endless conveyor with the rotational axes of the fasteners perpendicular to said track means for movement of the rotary fasteners transversely of their rotational axes in proper spaced relation relative to the washers of said strip, said conveyor and track means and said washer strip path converging at a small acute angle so that the rotary fasteners initially telescope with the washer strip at a point spaced from the initial engagement of the fastener carrying means of the endless conveyor with the rotary fasteners.

6. Apparatus for assembling rotary fasteners and washers, comprising means for feeding a washer strip over a predetermined path, a fastener element feed chute, and means for feeding a succession of rotary fasteners over a path from the feed chute in synchronism with the movement of said washers and relatively converging with the path of said strip to bring said rotary fasteners and the washers of said strip into telescoping relation, said fastener feeding means including a guideway and an endless chain for engaging fasteners and sliding said fasteners along said guideway, said endless chain holding said fasteners with their rotational axes perpendicular to said guideway for feeding said fasteners transversely of their rotational axes, and said guideway and said washer strip feeding path converging at a small acute angle so that the rotary fasteners initially telescope with the washer strip at a point spaced from the initial engagement of the endless chain with the rotary fasteners.

7. The method of assembling fastening elements and washer elements which comprises feeding a strip of washer elements along a predetermined path, feeding a succession of fastening elements transversely of their longitudinal axes and in synchronism with said washer elements along a rectilinear path, converging the path of the fastening elements with the path of said strip to telescope said fastening elements with the washer elements of said strip, forming a section on one of each pair of telescoped elements while retaining said washer elements in said strip and feeding said strip and telescoped fastening elements over a rectilinear continuation of said paths to retain the other element in telescoped relation therewith, and thereafter severing the washer elements from said strip to separate the telescoped fastening elements and washer elements from said strip.

8. Apparatus for assembling rotary fasteners having clamping faces and washers, comprising means providing a substantially flat fastener guiding surface, traveling conveyor means having spaced portions for engaging successive fasteners and forcing the clamping faces thereof flat against said guiding surface positively to drive said fasteners perpendicularly to their rotational axes, said conveyor means including means for properly spacing said rotary fasteners, and means for feeding a washer strip in synchronism with said fasteners over a predetermined path converging with said guiding surface to bring said fasteners and the washers of said strip into telescoping relation, said guiding surface and said washer strip feeding means converging at a small acute angle so that the rotary fasteners initially telescope with the washer strip at a point spaced from the initial engagement of the conveyor means with said rotary fasteners.

9. Apparatus for assembling headed screw elements and washers, comprising means for feeding a washer strip over a predetermined path, a rectilinear bifurcated screw element guiding surface converging with the path of said strip, and driving means spaced from and movable parallel to said guiding surface in synchronism with said washers for engaging the heads of successive screw blanks and forcing the undersides of said heads flat against said guiding surface to drive said screw blanks perpendicularly to their shanks, said driving means including means for properly spacing said screw elements to align said screw elements with the washers of said strip and bring said screw elements into telescoping relation with said washers, said screw element guiding surface and said washer strip feeding path converging at a small acute angle so that the screw elements and washers of the strip initially telescope at a point spaced from the initial engagement of the driving means with the screw elements.

10. Apparatus for assembling rotary fasteners and washers, comprising a rectilinear guiding surface, traveling conveyor means having a rectilinear portion disposed parallel to and spaced slightly from said rectilinear guiding surface to engage successive rotary fasteners and force said fasteners into sliding engagement with said guiding surface to drive said fasteners perpendicularly to their rotary axes, said conveyor means holding said rotary fasteners with their rotational axes perpendicular to said guiding surface, and means for feeding a washer strip synchronously with said fasteners over a predetermined path converging with said rectilinear guiding surface to bring said rotary fasteners and the washers of said strip into telescoping relation, said rectilinear guiding surface and said washer strip feeding path converging at a small acute angle so that the rotary fasteners initially telescope with the washer strip at a point spaced from the initial engagement of the conveyor means with said rotary fasteners.

11. Apparatus for producing unit assemblies of fastening elements and washer elements telescoped therewith comprising means for feeding a succession of fastening elements transversely of their longitudinal axes along a rectilinear path, means for feeding a strip of interconnected washer elements synchronously with said fastening elements along a path converging with the path of said fastening elements to bring said fastening elements and the washer elements of said strip into telescoping relation, means for feeding the assemblies so produced over a predetermined path, and constantly rotating means intersecting said predetermined path to engage an element of each assembly to twist the assemblies from said strip.

12. Apparatus for producing unit assemblies of fastening elements and washer elements telescoped therewith comprising means for feeding a succession of fastening elements transversely of their longitudinal axes along a rectilinear path, means for feeding a strip of interconnected washer elements synchronously with the movement of said fastening elements along a path converging with the path of said fastening elements to bring said fastening elements and the washer elements of said strip into telescoping relation, means for displacing a section on one of each pair of assembled elements to retain the other in telescoping relation therewith, means for feeding the assemblies so produced over a predetermined path, constantly rotating means intersecting said predetermined path to engage an element of each assembly to twist the assemblies from said strip, and means for operating said fastening element feeding means, said strip feeding means, said section displacing means, said assembly feeding means, and said rotating means in timed relation.

13. Apparatus for producing unit assemblies of headed screw elements and washers, comprising a rectilinear bifurcated guiding surface, conveyor means substantially parallel to and space slightly from said guiding surface to engage the heads of a succession of screw blanks to force the underside of said heads substantially flat against said guiding surface and drive said succession of screw blanks perpendicular to their shanks, said conveyor means including means for spacing said screw elements, means for feeding a washer strip in timed relation to said screw elements along a rectilinear path converging with said guiding surface to bring said screw elements and the washers of said strip into telescoping relation, means for engaging the shanks of the screw elements below the washers thereon after assembly to displace sections outwardly therefrom to retain said washers in assembled relation with said screw elements, means for feeding the assemblies so produced along a rectilinear path comprising a continuation of said guiding surface, and constantly rotating means intersecting said rectilinear path to engage successive assemblies and twist the assemblies from said washer strip.

14. Apparatus for producing unit assemblies of headed screw elements and washers, comprising a bifurcated guiding surface, an endless chain having one reach substantially parallel to and spaced slightly from said guiding surface to force the under side of said heads substantially against said guiding surface with the shanks of said screw elements perpendicular to said guiding surface for driving said succession of screw blanks perpendicular to their shanks, the links of said endless chain spacing said screw elements a predetermined distance apart, and a washer strip guideway gradually merging at a small acute angle with said guiding surface gradually to telescope the screw elements and washers in a washer strip, said screw elements initially telescoping with the washers of said strip at a point spaced from the initial engagement of said chain with said screw blanks, said washer strip being advanced by engagement of screw elements telescoped therewith.

15. Apparatus for assembling fastening elements and washer elements, comprising means for feeding a strip of interconnected washer elements over a predetermined path at a predetermined rate, means for feeding a succession of fastening elements over a predetermined rectilinear path converging with the path of said strip to bring said fastening elements and the washer elements of said strip into telescoping relation, said fastener element feeding means including a plurality of portions respectively interfitting with an end of a fastening element to space said fastening elements in accordance with the spacing of the washer elements of said strip, means for deforming a section of each pair of assembled elements permanently to trap the assembled elements together, means for feeding the assemblies so produced along a predetermined path, constantly rotating means intersecting said predetermined path to engage an element of each assembly to twist the assemblies from said strip, and means for operating said fastening element feeding means, said strip feeding means, said deforming means, said assembly feeding means, and said rotating means in predetermined timed relation.

16. Assembling apparatus as set forth in claim 15 wherein the rotating means is rotatable about the axis of the assembly feeding path.

17. Apparatus for assembling washers with fastening elements having clamping faces substantially perpendicular to their longitudinal axes comprising a guide track having a substantially planar surface engageable by said fastening element clamping faces, endless conveyor means having a reach disposed parallel to said guide surface, said endless conveyor means having a succession of fastening element engaging means thereon adapted to hold and feed fastening elements with their clamping faces against said surface, and means for feeding a strip of interconnected washers along a path converging with said guide track surface at a small acute angle to bring said fastening elements and the washers of said strip into telescoped relation, said succession of fastening element engaging means being spaced on said endless conveyor means a distance equal to the spacing between the centers of the washers of said strip whereby to space the fastening elements equal to the spacing of the washers, said fastening element engaging means engaging and holding said fastening elements with their clamping faces against said surface for feeding in properly spaced relation before the initial telescoping of said fastening elements and said washers, and means for operating said endless conveyor means and said washer strip feeding means in proper timed relation.

18. Apparatus as set forth in claim 17 and further including means for deforming one of each telescoped fastening element and washer to hold the telescoped fastening elements and washers in permanently telescoped relation, and means for thereafter detaching the washers from said strip to separate the telescoped fastening elements and washers from the strip.

19. Apparatus as set forth in claim 17 wherein the fastening elements each have a head and a shank, and wherein the guide track comprises a bifurcated guideway, said conveyor means holding the heads of said fastening elements against said bifurcated guideway with the shanks perpendicular thereto.

20. Apparatus as set forth in claim 19 and further including means for deforming the shank of each fastening element after telescoping thereof with a washer, and means for detaching the washers from said strip following such deformation, said deforming means and said detaching means being operated in timed relation with said conveyor means and said strip feeding means.

21. Apparatus as set forth in claim 20 wherein the endless conveyor means comprises a chain.

22. Apparatus for producing fastening units of screw blanks and washers comprising means for feeding a strip of interconnected washers over a predetermined path, means for feeding a succession of screw blanks over a predetermined path into telescoped relation with the washers of said strip, means having a pair of swaging sections thereon spaced apart less than the shank diameter of said screw blanks and engageable with successive shanks from the side thereof and on the opposite side of the washers telescoped therewith to the heads of said screw blanks to deform sections of said shanks outwardly permanently to trap said washers and said screw blanks in assembled relation, said shank sections being adapted for effacement in a subsequent thread rolling operation, means for thereafter severing the washers from the strip to separate the fastening units so formed, and means for operating said strip feeding means, said screw blank feeding means, said swaging means, and said severing means in proper time relation.

23. Apparatus as set forth in claim 22 wherein the swaging means comprises a rotary member having a notch therein, the edges of said notch forming said swaging sections.

24. Apparatus as set forth in claim 23 wherein the rotary member is provided with a series of notches spaced about its periphery.

25. Apparatus for producing fastening units of screw blanks and washers comprising means for feeding telescoped screw blanks and washers along a predetermined path, means on one side of said path having a pair of swaging sections thereon spaced apart less than the shank diameter of said screw blanks and engageable with successive shanks from the side thereof and on the opposite side of the washers telescoped therewith to the heads of said screw blanks to deform sections of said shanks outwardly permanently to trap said washers and said screw blanks in assembled relation, said sections being adapted for effacement in a subsequent thread rolling operation, means for thereafter severing the washers from the strip to separate the fastening units so formed, and means for operating said feeding means, said swaging means, and said severing means in proper time relation.

26. Apparatus for producing unit assemblies of fastening elements and washer elements comprising means for feeding a succession of fastening elements transversely of their longitudinal axes along a rectilinear path, means for feeding a strip of interconnected washer elements along a path converging with the path of said fastening elements to bring said fastening elements of said strip into telescoping relation, means for deforming one element of each telescoped pair of elements to retain the elements in permanently telescoped relation, means for thereafter severing the washer elements from the strip to separate the unit assemblies so formed, and means for operating said fastening element feeding means, said strip feeding means, said deforming means, and said severing means in proper time relation.

References Cited in the file of this patent

UNITED STATES PATENTS

| | | |
|---|---|---|
| 686,122 | Packer | Nov. 5, 1901 |
| 2,271,154 | Niskanen | Jan. 27, 1942 |
| 2,284,676 | Nielsen | June 2, 1942 |
| 2,284,698 | Trotter | June 2, 1942 |
| 2,303,224 | Olson | Nov. 24, 1942 |
| 2,390,121 | Poupitch | Dec. 4, 1945 |
| 2,540,058 | Stern | Jan. 30, 1951 |
| 2,593,732 | Dahlman | Apr. 22, 1952 |
| 2,642,593 | Poupitch | June 23, 1953 |